Nov. 13, 1923. 1,474,325
T. KALLMEYER
REVOLVING PISTON
Filed May 5, 1922
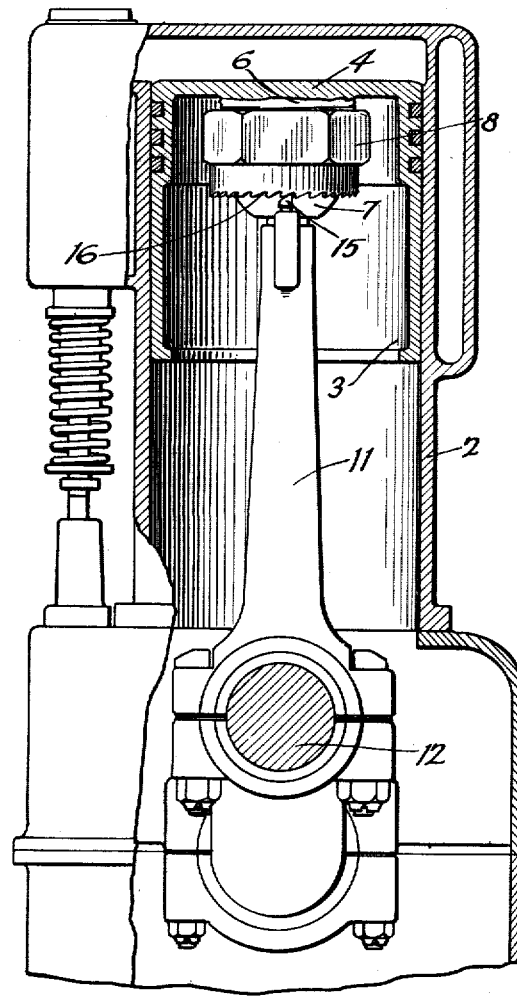
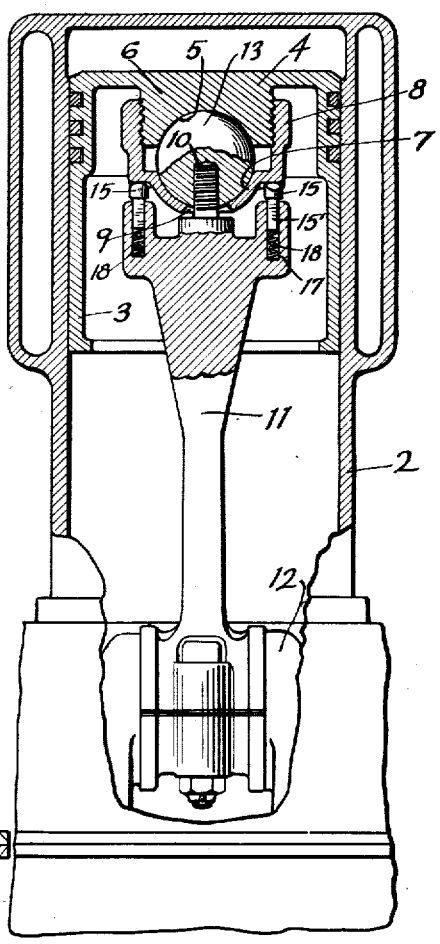
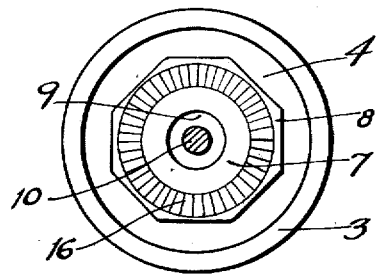
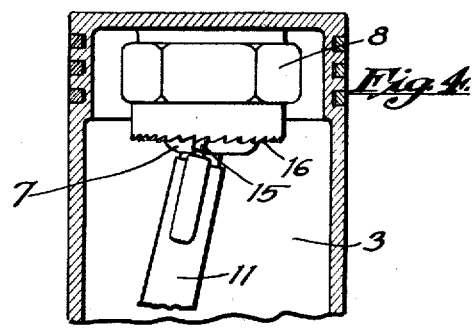
Inventor
THEOPHILUS KALLMEYER.
By Hazard & Miller
Attorneys Patented Nov. 13, 1923.

1,474,325

UNITED STATES PATENT OFFICE.

THEOPHILUS KALLMEYER, OF SANTA PAULA, CALIFORNIA.

REVOLVING PISTON.

Application filed May 5, 1922. Serial No. 558,582.

*To all whom it may concern:*

Be it known that I, THEOPHILUS KALLMEYER, a citizen of the United States, residing at Santa Paula, in the county of Ventura and State of California, have invented new and useful Improvements in Revolving Pistons, of which the following is a specification.

This invention relates to piston constructions and has for its object to provide a piston so connected to its pitman that the piston is adapted to rotate about its own axis.

A further object of the invention is to provide means for positively impelling a rotative motion to the piston and it is an object to provide impelling means acting automatically during the oscillations of the pitman during rotation of a driving crank with which the mechanism may be combined.

An embodiment of the invention is described in the following specification and illustrated in the accompanying drawings, in which Fig. 1 is a longitudinal section of a chamber in which a piston reciprocates and with which the rotating means is combined.

Fig. 2 is a longitudinal section taken on a plane at right angles to the plane of Fig. 1.

Fig. 3 is a plan of the removed piston showing the toothed ball plate.

Fig. 4 is a detail showing the impelling means in active pushing position.

The invention is embodied in the present case in combination with an internal combustion engine cylinder 2 in which there is reciprocable a piston 3 which is provided with a head 4, having axially arranged a ball seat or socket 5 which may be formed within an axial boss 6. The boss is shown as externally threaded to receive the internally threaded flange 8 of a ball cup or socket 7 complementary to the ball seat 5. The socket member 7 has a central aperture 9 and through this extends a threaded shank or stem 10 attached to, or forming a part of, the contiguous end of a connecting rod or pitman 11 whose swinging end is connected to the engine crank 12.

On the outer end of the threaded stem 10 is provided a ball 13 clamped between the ball seat 5 and the socket member 7 and, therefore, providing a universal or ball joint. This permits of rotation of the piston 3 about its own axis freely during reciprocation of the piston.

It is desirable to provide means for positively imparting a rotary motion to the piston and means for that purpose are provided herewith. A form of impelling device is indicated as comprising one or more impelling dogs 15 having toothed ends to engage a toothed or roughened zone 16 which may be formed around the shoulder of the socket member 7. The dogs 15 are yieldingly mounted in pockets 17 in the pivoted end of the connecting rod 11 and are normally thrust against the shoulder part 16 as by expansile springs 18. Preferably, the dogs have non-circular shanks 15' sliding in the pockets 17 so as to be held against rotation and, therefore, presenting constantly an active impelling tooth or part to engage the tooth surface 16 of the socket member 7.

In operation of the connecting rod, when it is tilted to the position shown in Fig. 4, about the center of the ball joint, the pushing dog 15 takes a position to one side of a plane along the axis of the piston and of the socket member 7. As the connecting rod swings up into axial position the angular movement of the dog 15 causes it to positively engage the toothed surface 16 of the socket member 7, and this being fixed to the piston 3, imparts a slight rotary movement thereto. By providing a plurality of the dogs 15, it will be seen that while one is on the inactive receding stroke, another will be in the acting stroke by virtue, for instance, of the dogs being arranged in diametrically opposite positions, as shown in Fig. 2.

Various modifications and changes may be resorted to within the spirit of the invention as claimed.

What is claimed is:

1. A reciprocating piston and a pitman rod operatively connected thereto by a ball and socket to reciprocate the piston, and ratchet means swinging on an axis of the ball providing for rotation of the piston on its own axis.

2. A reciprocating piston and a pitman rod operatively connected thereto to reciprocate the piston, a ball and socket connection between the piston and the pitman providing for complete rotation of the piston on its own axis, and means for positively imparting a full rotary motion to the piston during its reciprocations.

3. A reciprocating piston and a pitman rod operatively connected thereto to reciprocate the piston, a ball and socket connection between the piston and the pitman providing for rotation of the piston on its own axis and including a toothed ball cap, and ratchets engaging said cap for positively imparting a rotary motion to the piston during its reciprocations, said piston rotating means being combined with, and made effective by, the pitman.

4. A reciprocating piston and a pitman rod operatively connected thereto to reciprocate the piston, a connection between the piston and the pitman providing for rotation of the piston on its own axis, and means for positively imparting a rotary motion to the piston during its reciprocations, said piston rotating means being combined with, and made effective by, the pitman, the piston rotating means including a plurality of yieldingly mounted impelling members attached to the connecting rod.

5. A piston, a pitman rod, ball and socket connections joining the same, and means rendered effective by the oscillations of the pitman rod for rotating completely the piston on its own axis.

6. A piston, a pitman rod, ball and socket connections joining the same, and means rendered effective by the oscillations of the pitman rod for rotating the piston on its own axis, said means including a toothed annular zone on the socket part and a series of dogs mounted on the pitman to engage the toothed zone; the dogs being operative in one direction during oscillations of the pitman.

In testimony whereof I have signed my name to this specification.

T. KALLMEYER.